(12) United States Patent
Amano et al.

(10) Patent No.: US 8,641,208 B2
(45) Date of Patent: Feb. 4, 2014

(54) REFRACTIVE OPTICS AND PROJECTION DISPLAY APPARATUS

(75) Inventors: Ryuhei Amano, Hirakata (JP); Takashi Ikeda, Higashi Osaka (JP); Kazuhisa Takahashi, Oshu (JP); Yoshitsugu Kohno, Hanamaki (JP); Osamu Nagase, Hanamaki (JP)

(73) Assignees: Sanyo Electric Co., Ltd., Moriguchi-shi (JP); Ricoh Optical Industries Co., Ltd., Hanamaki (JP)

(*) Notice: Subject to any disclaimer, the term of this patent is extended or adjusted under 35 U.S.C. 154(b) by 19 days.

(21) Appl. No.: 13/078,349

(22) Filed: Apr. 1, 2011

(65) Prior Publication Data

US 2011/0292355 A1  Dec. 1, 2011

Related U.S. Application Data

(63) Continuation of application No. PCT/JP2009/066923, filed on Sep. 29, 2009.

(30) Foreign Application Priority Data

Oct. 3, 2008 (JP) ................. 2008-258972

(51) Int. Cl.
*G03B 21/20* (2006.01)
*G02B 7/02* (2006.01)

(52) U.S. Cl.
USPC .......................... 353/102; 359/819

(58) Field of Classification Search
USPC ...................... 353/102, 101, 100
See application file for complete search history.

(56) References Cited

U.S. PATENT DOCUMENTS

| 5,648,871 | A | 7/1997 | Okuyama et al. |
| 6,631,994 | B2 | 10/2003 | Suzuki et al. |
| 6,994,437 | B2 | 2/2006 | Suzuki et al. |
| 7,841,728 | B2 | 11/2010 | Morikuni et al. |
| 7,984,994 | B2 | 7/2011 | Morikuni et al. |
| 2001/0050758 | A1 | 12/2001 | Suzuki et al. |
| 2007/0097337 | A1 | 5/2007 | Morikuni et al. |
| 2008/0192208 | A1 | 8/2008 | Benoit et al. |

FOREIGN PATENT DOCUMENTS

| CN | 1380989 A | 11/2002 |
| CN | 101160548 A | 4/2008 |
| JP | H06-347681 A | 12/1994 |
| JP | 2006-235516 A | 9/2006 |
| JP | 2007-513384 A | 5/2007 |
| WO | 2006/058884 A1 | 6/2006 |
| WO | 2007/046506 A1 | 4/2007 |

*Primary Examiner* — William C Dowling
*Assistant Examiner* — Ryan Howard
(74) *Attorney, Agent, or Firm* — Marvin A. Motsenbocker; Mots Law, PLLC

(57) ABSTRACT

Disclosed are a projection display apparatus and a projection optics provided in the projection display apparatus. The projection optics has a refractive optics and a reflective optics. In the refractive optics, a lens (non-circular lens) provided on a reflective optics side has a non-circular shape forming part of an imaginary circular region whose center is an optical axis center of the refractive optics. In other words, the non-circular lens has a shape of a cut-out portion of an imaginary circular lens having an optical axis center coinciding with the optical axis center of the refractive optics.

9 Claims, 13 Drawing Sheets

☐ ··· IMAGINARY FRONT CASE

US 8,641,208 B2

REFRACTIVE OPTICS AND PROJECTION DISPLAY APPARATUS

TECHNICAL FIELD

The present invention relates to a refractive optics forming part of a projection optics including a reflective optics, and to a projection display apparatus.

BACKGROUND ART

There has been heretofore known a projection display apparatus including an imager and a projection optics, the imager configured to modulate light emitted from a light source, the projection optics configured to project the light outputted from the imager onto a screen.

In order for the projection display apparatus to display a large image on the screen, a distance between the projection optics and the screen (hereinafter, projection distance) has to be long. In this respect, proposed is a projection display system which achieves reduction in the projection distance by using a reflecting mirror reflecting light outputted from an imager to a screen (for example, Patent Literature 1).

When the projection distance is made short, the projection display apparatus is placed near the screen. Thus, the projection display apparatus is more likely to enter user's field of view. Accordingly, the projection display apparatus has to project light in an oblique direction from above, below, or either side of the screen. For example, the projection display system described above, the imager and a projection optics are shifted from each other in the vertical direction in their positional relationship, and a concave mirror is used as the reflecting mirror. Thus, the reduction in the projection distance and the projection in the oblique direction are both achieved.

Note that, as a technique to simply achieve reduction in the projection distance, also proposed is a technique using a wide-angle lens as a lens constituting a projection optics (for example, Patent Literature 2).

In the technique using the reflecting mirror, the reflecting mirror is added to the conventional configuration. In the technique using the wide-angle lens as the lens constituting the projection optics, the size of the lens constituting the projection optics is larger than that of the conventional configuration. On the other hand, reduction in size and weight of a projection display system is desired to gain freedom in carrying and placing of the projection display system.

CITATION LIST

Patent Literatures

[Patent Literature 1] Japanese Patent Application Publication 2006-235516
[Patent Literature 2] Published Japanese Translation of PCT International Application No. 2007-513384

SUMMARY OF THE INVENTION

A refractive optics according to one aspect forms part of a projection optics including a reflective optics having at least one reflecting mirror, and has a group of lenses. The refractive optics includes: a non-circular lens (for example lenses 41 and 42) which is a lens in the group of lenses provided on a side closer to the reflective optics; and a holder (for example, front case 20) which has an inner wall surface (for example, inner wall surface 21) holding the non-circular lens and which has an annular cross section. The non-circular lens has an optical axis center coinciding with an optical axis center of the refractive optics, and has a non-circular shape forming part of an imaginary circular region whose center is the optical axis center of the refractive optics. The optical axis center of the non-circular lens does not coincide with a center axis of a cylinder formed by the inner wall surface.

In the aspect described above, the refractive optics further includes: a first lens frame (first lens frame 220) which has an inner wall surface (inner wall surface 227) holding the holder (for example, holder 120) and which has an annular cross section; and a second lens frame (second lens frame 320) which has an inner wall surface (inner wall surface 327) holding the first lens frame and which has an annular cross section. The holder has a guide pin (for example, guide pin 121A) which protrudes outward in a radial direction of a circle formed by the inner wall surface of the holder. The first lens frame has a straight slot (for example, straight slot 221) which extends in a direction along an optical axis of the refractive optics. The second lens frame has a cam slot (for example, cam slot 321) which extends in a direction oblique to the optical axis of the refractive optics. The guide pin is inserted into the straight slot and the cam slot.

In the aspect described above, the second lens frame has an adjuster (adjuster 324) which protrudes outward in a radial direction of a circle formed by an inner wall surface of the second lens frame.

In the aspect described above, the non-circular lens is provided at an area not overlapping the optical axis center of the refractive optics.

In the aspect described above, the reflecting mirror is a concave mirror.

The projection display apparatus according to another aspect includes an imager and a projection optics configured to project light outputted from the imager. The projection optics includes a refractive optics and a reflective optics having at least one reflecting mirror, the refractive optics including a plurality of lenses. The refractive optics has a non-circular lens and a holder, the non-circular lens being one of the plurality of lenses provided on a side closer to the reflective optics, the holder having an annular cross section and having an inner wall surface holding the non-circular lens. The non-circular lens has an optical axis center coinciding with an optical axis center of the refractive optics, and has a non-circular shape forming part of an imaginary circular region whose center is the optical axis center of the refractive optics. The optical axis center of the non-circular lens does not coincide with a center axis of a cylinder formed by the inner wall surface. The imager is provided at a position shifted from the optical axis center of the refractive optics.

EMBODIMENT FOR CARRYING OUT THE INVENTION

Hereinbelow, the refractive optics and the projection display apparatus according to embodiments of the present invention will be described with reference to the drawings. Note that, in the following description of the drawings, same or similar reference signs denote same or similar portions.

It should be noted that the drawings are schematic and ratios of dimensions and the like are different from actual ones. Therefore, specific dimensions and the like should be determined in consideration of the following description. Moreover, the drawings also include portions having different dimensional relationships and ratios from each other, as a matter of course.

Outline of Embodiments

Embodiments relate to a projection display apparatus which achieves projection in an oblique direction and a projection optics provided in the projection display apparatus. The projection optics includes a refractive optics and a reflective optics. In the refractive optics, lenses (non-circular lenses) provided on the reflective optics side each have a non-circular shape forming part of an imaginary circular region using an optical axis center of the refractive optics as a center. In other words, the non-circular lenses each have a shape of a cut-out portion of an imaginary circular lens having an optical axis center coinciding with the optical axis center of the refractive optics.

Circular lenses (that is, imaginary circular lenses) each having an optical axis center coinciding with the optical axis center of a refractive optics are used in the background art. On the other hand, the embodiments employ the non-circular lenses respectively forming part of the imaginary circular lenses. Thus, a case housing the non-circular lenses can be reduced in size. Moreover, the weights of the lenses can be reduced.

First Embodiment

Configuration of Refractive Optics

Figure 1:
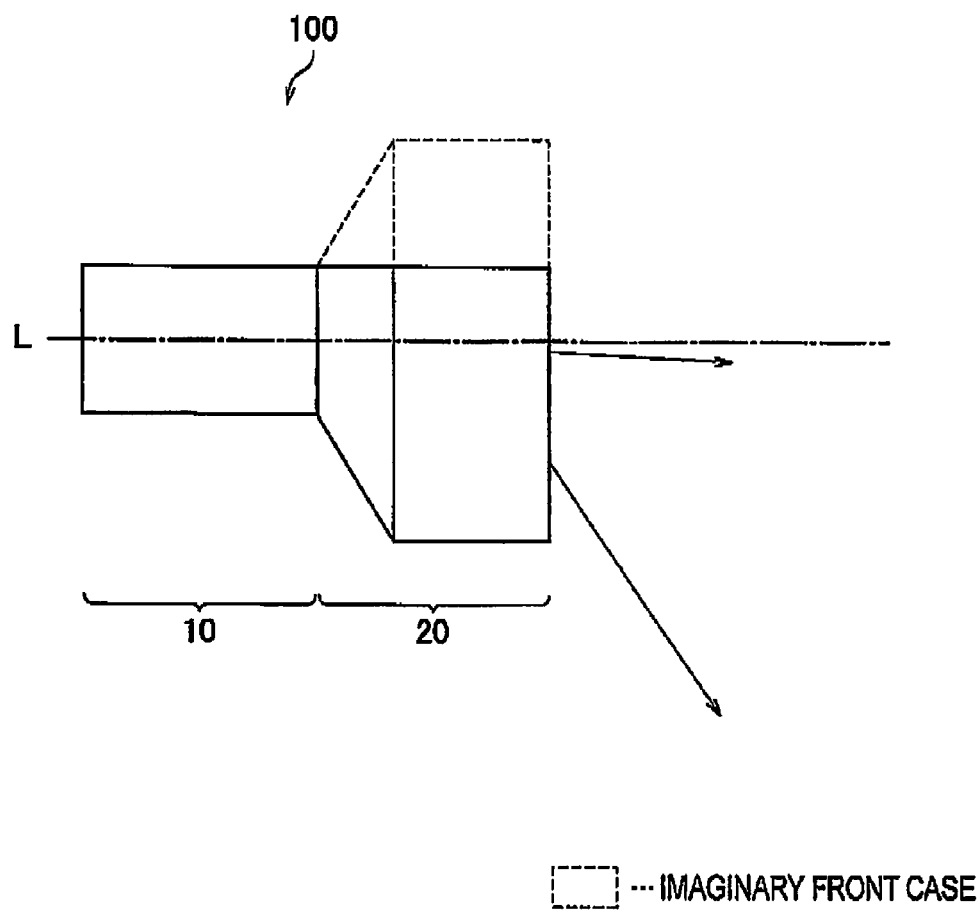
FIG. 1 is a view showing a refractive optics 100 according to a first embodiment.
Figure 2:
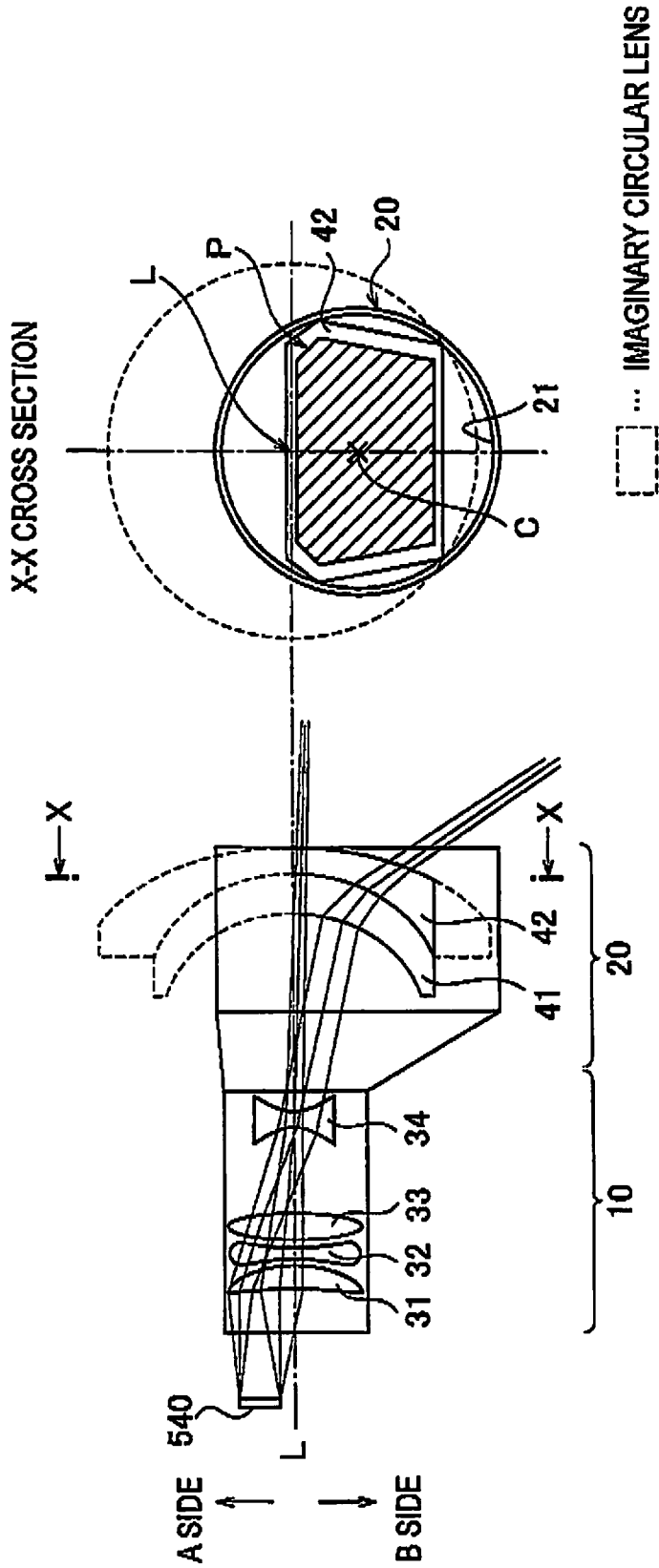
FIG. 2 is a view showing the refractive optics 100 according to the first embodiment.

A refractive optics according to a first embodiment will be described below with reference to the drawings. FIGS. 1 and 2 are views illustrating a refractive optics 100 according to the first embodiment.

As shown in FIG. 1, the refractive optics 100 forms part of a projection optics which projects image light generated by an image light generator (not shown). The projection optics includes a reflective optics which reflects light outputted from the refractive optics 100 as shown in a second embodiment described later.

Specifically, the refractive optics 100 includes a rear case 10 provided on a side closer to the image light generator and a front case 20 provided on a side farther from the image light generator.

The rear case 10 has a cylindrical shape. In other words, the rear case 10 has an annular cross section. The center of the cross section of the rear case 10 coincides with an optical axis center L of the refractive optics 100. The rear case 10 houses circular lenses, which will be described later.

The front case 20 has a cylindrical shape. In other words, the front case 20 has an annular cross section. The center of the front case 20 is shifted from the optical axis center L of the refractive optics 100. The front case 20 houses non-circular lenses, which will be described later.

Here, the non-circular lenses housed in the front case 20 respectively form part of lenses (hereinafter, imaginary circular lenses) each of which is an imaginary lens shaped in a circle having its center at the optical axis center L of the refractive optics 100. In order to project image light with wide angle, the diameter of the imaginary circular lens is set larger than the diameter of any of the circular lenses housed in the rear case 10.

Note that, dotted lines in FIG. 1 illustrates a front case (hereinafter, imaginary front case) which is capable of housing the imaginary circular lenses. The optical axis center of each of the imaginary circular lenses has to coincide with the optical axis center L of the refractive optics 100. Accordingly, the center of the cross section of the imaginary front case coincides with the optical axis center L of the refractive optics 100.

As shown in FIG. 2, the rear case 10 has the cylindrical shape. In other words, the rear case 10 has the annular cross section. The rear case 10 has a group of multiple lenses (lenses 31 to 34).

As described above, the lenses 31 to 34 are lenses with circular shapes. The optical axis centers of the lenses 31 to 34 coincide with the optical axis center L of the refractive optics 100. The lenses 31 to 34 guide light outputted from an imager 540 provided in the image light generator, to the front case 20.

Specifically, the imager 540 is shifted to an A side (see FIG. 2) of the optical axis center L of the refractive optics 100. The lenses 31 to 34 guide the light outputted from the imager 540 to a B side (see FIG. 2) of the optical axis center L of the refractive optics 100. Thus, the light outputted from the imager 540 is projected in an oblique direction.

Note that, "A side" and "B side" are not particularly limited to upper and lower sides or right and left sides. "A side" and "B side" described here are merely terms used to describe two sides which are opposite to each other with the optical axis center L of the refractive optics 100 in between.

The front case 20 has the cylindrical shape. In other words, the front case 20 has the annular cross section as shown in an X-X cross section. The front case 20 has a group of multiple lenses (lenses 41 and 42).

The lenses 41 and 42 are non-circular lenses. The optical axis centers of the lenses 41 and 42 coincide with the optical axis center L of the refractive optics 100. As described above, the lenses 41 and 42 respectively form part of the imaginary circular lenses (imaginary circular regions) each having the optical axis center coinciding with the optical axis center L of the refractive optics 100.

In other words, the lenses 41 and 42 each have a non-circular shape corresponding to the shape of an effective region P provided at a position shifted from the optical axis center L of the refractive optics 100. The effective region P is a region through which the light outputted from the lenses 31 to 34 housed in the rear case 10 passes.

Specifically, the light outputted from the lenses 31 to 34 is guided to the B side (see FIG. 2) of the optical axis center L of the refractive optics 100. Accordingly, the effective regions P are provided at positions shifted to the B side (see FIG. 2) of the optical axis center L of the refractive optics 100. In other words, the lenses 41 and 42 are provided at positions shifted to the B side (see FIG. 2) of the optical axis center L of the refractive optics 100.

Here, the effective regions P of the respective lenses 41 and 42 are preferably provided at positions not overlapping the optical axis center L of the refractive optics 100 so that a projector distance can be reduced and the projection in an oblique direction can be performed at an acute angle.

Note that, the effective regions P of the respective non-circular lenses provided in the front case 20 are different from each other. For example, the effective region P of the lens 41 is different from the effective region P of the lens 42.

The front case 20 has an inner wall surface 21 holding the lenses 41 and 42. Since the front case 20 has the cylindrical shape, the inner wall surface 21 has a circular shape in a cross section of the front case 20. The optical axis center L (the optical axis center L of the lenses 41 and 42) of the refractive optics 100 does not coincide with a center axis C of the cylinder formed by the inner wall surface 21. Specifically, the center axis C is shifted to the B side (see FIG. 2) of the optical axis center L.

In the first embodiment, the front case 20 forms a holder which holds the lenses 41 and 42.

Note that, the dotted lines in FIG. 2 illustrate the imaginary circular lenses each having the optical axis center coinciding with the optical axis center L of the refractive optics 100. The imaginary front case has to house the imaginary circular lenses. As described above, since the lenses 41 and 42 respectively form part of the imaginary circular lenses, the front case 20 can be made smaller than the imaginary front case.

(Operation and Effect)

In the first embodiment, the lenses 41 and 42 respectively form part of the imaginary circular lenses each having the optical axis center coinciding with the optical axis center L of the refractive optics. Accordingly, compared to a case where the imaginary circular lenses are housed in the imaginary front case, the front case 20 can be made smaller in size, and the lenses 41 and 42 can be reduced in weight.

Modification 1

Modification 1 of the first embodiment will be described below with reference to the drawings. The difference between Modification 1 and the first embodiment will be mainly described below. Specifically, in Modification 1, at least some of lenses in the lens group housed in a front case 20 are supported respectively by supporting portions provided in an inner wall surface 21 of the front case 20.

(Configuration of Refractive Optics)

Figure 3:
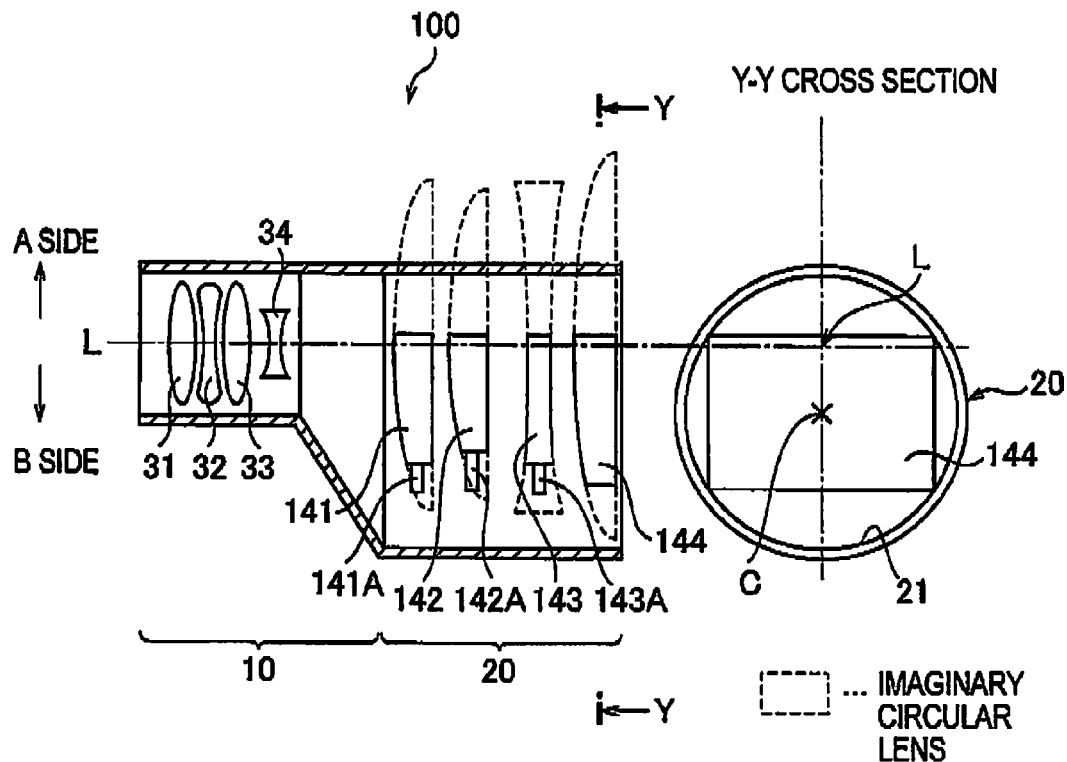
FIG. 3 is a view showing a refractive optics 100 according to Modification 1 of the first embodiment.
Figure 4:
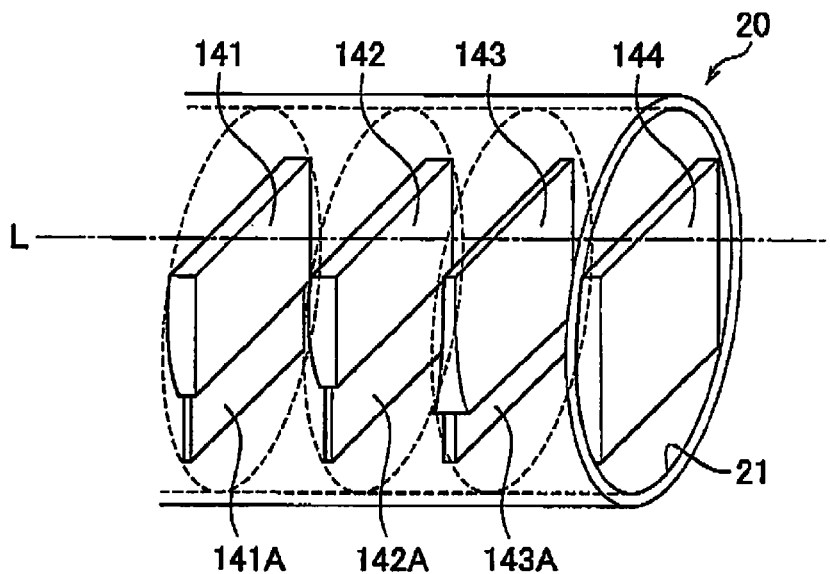
FIG. 4 is a view showing a front case 20 according to Modification 1 of the first embodiment.

A refractive optics according to Modification 1 will be described below with reference to the drawings. FIGS. 3 and 4 are views illustrating a refractive optics 100 according to Modification 1.

As shown in FIGS. 3 and 4, the front case 20 includes lenses 141 to 144 instead of the lenses 41 and 42. The front case 20 includes a supporting portion 141A supporting the lens 141, a supporting portion 142A supporting the lens 142, and a supporting portion 143A supporting the lens 143. Note that, the lens 144 is held by the inner wall surface 21 of the front case 20.

As shown in a Y-Y cross section, the lenses 141 to 144 respectively form part of imaginary circular lenses (imaginary circular regions) each having an optical axis center which coincides with an optical axis center L of the refractive optics 100, as similar to the lenses 41 and 42. The lenses 141 to 144 each have a non-circular shape corresponding to an effective region P shifted from the optical axis center L of the refractive optics 100. Note that, the optical axis centers of the lenses 141 to 144 coincide with the optical axis center L of the refractive optics 100.

As in the first embodiment, the optical axis center L (optical axis centers of the lenses 141 to 144) of the refractive optics 100 does not coincide with a center axis C of a cylinder formed by the inner wall surface 21 of the front case 20. Specifically, the center axis C is shifted to a B side (see FIG. 3) of the optical axis center L.

As shown in FIG. 4, the supporting portions 141A to 143A are provided on the inner wall surface 21 of the front case 20.

Note that, dotted lines in FIG. 3 illustrate the imaginary circular lenses each having an optical axis center coinciding with the optical axis center L of the refractive optics 100. As described above, since the lenses 141 to 144 respectively form part of the imaginary circular lenses, the front case 20 can be reduced in size.

As described above, the effective regions P of the respective non-circular lenses provided in the front case 20 are different from each other. Accordingly, the inner wall surface 21 forms a cylinder which houses the non-circular lens having the largest effective region P among the multiple non-circular lenses provided in the front case 20.

(Operation and Effect)

As in the first embodiment, Modification 1 employs the lenses 141 to 144 respectively forming part of the imaginary circular lenses each having the optical axis center coinciding with the optical axis center L of the refractive optics. Accordingly, reduction in size and weight can be achieved.

In Modification 1, the lenses 141 to 143 are supported respectively by the supporting portions 141A to 143A provided on the inner wall surface 21 of the front case 20. Accordingly, even if the sizes of the respective lenses 141 to 143 are different from each other, the lenses 141 to 143 can be housed in the front case 20.

Modification 2

Modification 2 of the first embodiment will be described below with reference to the drawings. The difference between Modification 2 and Modification 1 of the first embodiment will be mainly described below. Specifically, in Modification 2, at least some of lenses in the lens group housed in a front case 20 are configured to be movable.

(Configuration of Refractive Optics)

Figure 5:
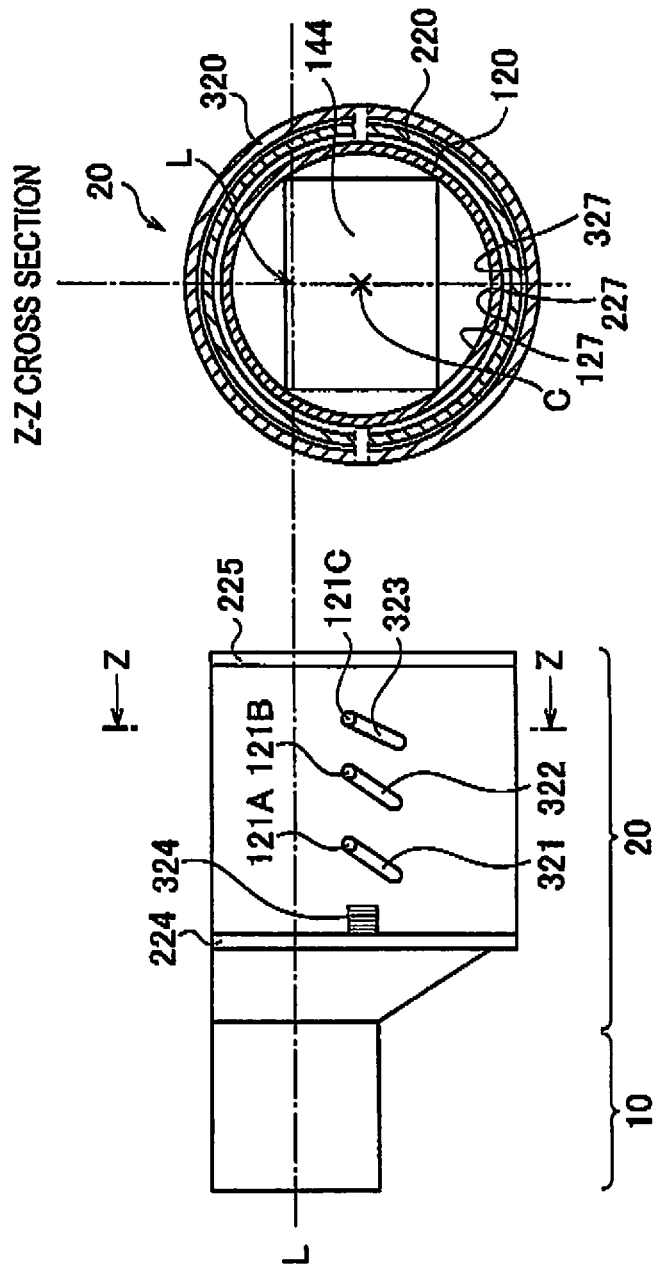
FIG. 5 is a view showing a refractive optics 100 according to Modification 2 of the first embodiment.

A refractive optics according to Modification 2 will be described below with reference to the drawings. FIG. 5 is a view illustrating a refractive optics 100 according to Modification 2.

As shown in FIG. 5, the front case 20 includes holders 120, a first lens frame 220, and a second lens frame 320.

Each of the holders 120 has an annular cross section as shown in a Z-Z cross section. The holder 120 has an inner wall surface 127 holding a non-circular lens. The inner wall surface 127 forms a circle in a cross section of the holder 120. An optical axis center L (optical axis centers of the non-circular lenses) of the refractive optics 100 does not coincide with a center axis C of a cylinder formed by the inner wall surface 127.

The first lens frame 220 has a cylindrical shape. In other words, the first lens frame 220 has an annular cross section as shown in the Z-Z cross section. The first lens frame 220 has an inner wall surface 227 holding the holders 120. The inner wall surface 227 forms a circle in the cross section of the first lens frame 220. The optical axis center L (optical axis centers of the non-circular lenses) of the refractive optics 100 does not coincide with a center axis C of a cylinder formed by the inner wall surface 227. The circle formed by the inner wall surface 227 is preferably approximately the same shape as the circles formed by the outer circumferences of the holders 120.

The second lens frame 320 has a cylindrical shape. In other words, the second lens frame 320 has an annular cross section as shown in the Z-Z cross section. The second lens frame 320 has an inner wall surface 327 holding the first lens frame 220. The inner wall surface 327 forms a circle in the cross section of the second lens frame 320. The optical axis center L (optical axis centers of the non-circular lenses) of the refractive optics 100 does not coincide with a center axis C of a cylinder formed by the inner wall surface 327. The circle formed by the inner wall surface 327 is preferably approximately the same shape as the circle formed by the outer circumference of the first lens frame 220.

Figure 6:
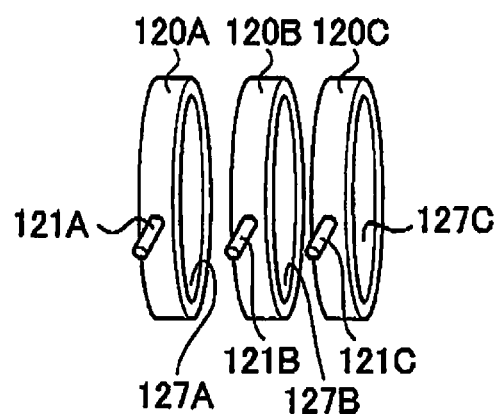
FIG. 6 is a view showing a holder 120 according to Modification 2 of the first embodiment.

As shown in FIG. 6, the holders 120 include holders 120A to 120C. The holders 120A to 120C each have an annular shape. The holder 120A has an inner wall surface 127A holding a lens 141 (not shown). Similarly, the holder 120B has an inner wall surface 127B holding a lens 142 (not shown), and the holder 120C has an inner wall surface 127C holding a lens 143 (not shown).

The holder 120A has a guide pin 121A which protrudes outward in a radial direction of a circle formed by the inner wall surface 127A. Similarly, the holder 120B has a guide pin 121B which protrudes outward in a radial direction of a circle formed by the inner wall surface 127B, and the holder 120C has a guide pin 121C which protrudes outward in a radial direction of a circle formed by the inner wall surface 127C.

Figure 7:
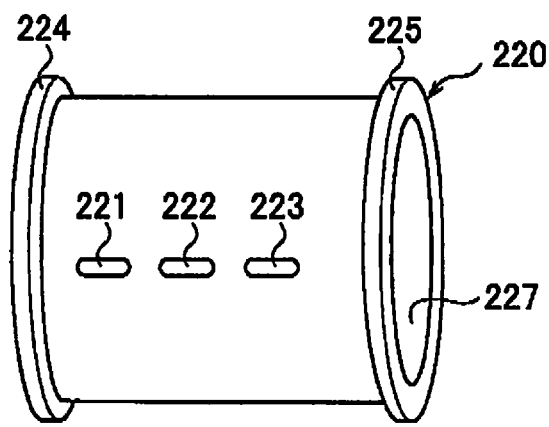
FIG. 7 is a view showing a first lens frame 220 according to Modification 2 of the first embodiment.

As shown in FIG. 7, the first lens frame 220 has the cylindrical shape. The first lens frame 220 has multiple straight slots (straight slot 221, straight slot 222, and straight slot 223) extending in a direction of the optical axis center L of the refractive optics 100. The guide pin 121A is inserted into the straight slot 221. Similarly, the guide pin 121B is inserted into the straight slot 222, and the guide pin 121C is inserted into the straight slot 223.

The first lens frame 220 has locking portions 224 and 225 which project outward from a body portion of the first lens frame 220 in the radial direction of the circle formed by the inner wall surface 227. The locking portions 224 and 225 are provided respectively at both ends of the first lens frame 220 in the direction of the optical axis center L of the refractive optics 100. The locking portions 224 and 225 lock the second lens frame 320 therebetween.

Figure 8:
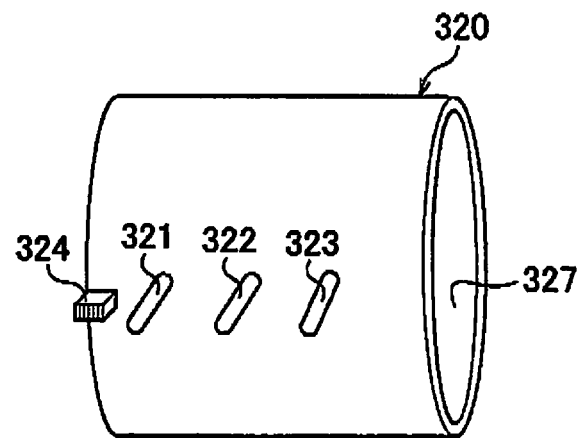
FIG. 8 is a view showing a second lens frame 320 according to Modification 2 of the first embodiment.

As shown in FIG. 8, the second lens frame 320 has the cylindrical shape. The second lens frame 320 has multiple cam slots (cam slot 321, cam slot 322, and cam slot 323) which extend in directions oblique to the direction of the optical axis center L of the refractive optics 100. The guide pin 121A is inserted into the cam slot 321. Similarly, the guide pin 121B is inserted into the cam slot 322, and the guide pin 121C is inserted into the cam slot 323. Angles at which the respective cam slots 321 to 323 are inclined with respect to the optical axis center L may be different from each other.

The second lens frame 320 has an adjuster 324 for rotating the second lens frame 320. The adjuster 324, for example, has a shape protruding outward in a radial direction of the circle formed by the inner wall surface 327. Note that, the shape of the adjuster 324 is not limited to this.

Figure 9:
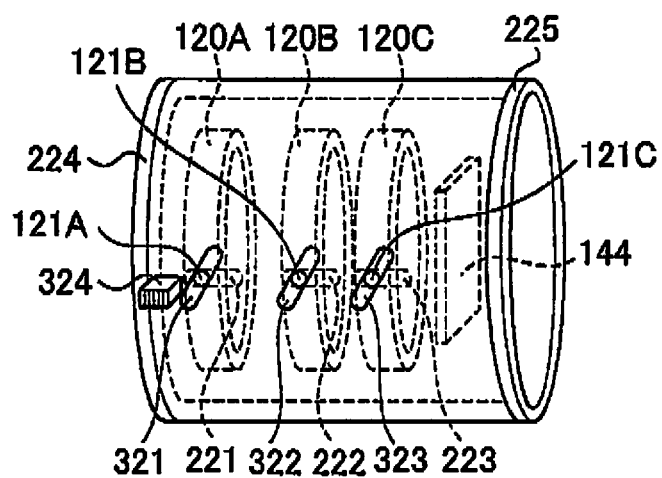
FIG. 9 is a view showing a front case 20 according to Modification 2 of the first embodiment.

As shown in FIG. 9, the holders 120, the first lens frame 220, and the second lens frame 320 constitute the front case 20. The guide pin 121A is inserted into the straight slot 221 and the cam slot 321. Similarly, the guide pin 121B is inserted into the straight slot 222 and the cam slot 322, and the guide pin 121C is inserted into the straight slot 223 and the cam slot 323.

When the second lens frame 320 is rotated by using the adjuster 324, the holders 120 move along the optical axis center L of the refractive optics 100 without changing the directions of the non-circular lenses held by the holders 120. In other words, the lenses 141 to 143 move along the optical axis center L of the refractive optics 100 by the rotation of the second lens frame 320.

Note that, the holder 120A preferably has a pair of guide pins 121A. Similarly, it is preferable that the holder 120B has a pair of guide pins 121B and the holder 120C has a pair of guide pins 121C.

In such a case, the first lens frame 220 has a pair of straight slots 221 corresponding to the guide pins 121A. Similarly, the first lens frame 220 has a pair of straight slots 222 corresponding to the guide pins 121B, and a pair of straight slots 223 corresponding to the guide pins 121C.

Moreover, the second lens frame 320 has a pair of cam slots 321 corresponding to the guide pins 121A. Similarly, the second lens frame 320 has a pair of cam slots 322 corresponding to the guide pins 121B, and a pair of cam slots 323 corresponding to the guide pins 121C.

(Operation and Effect)

As in the first embodiment, Modification 2 employs the lenses 141 to 144 respectively forming part of the imaginary circular lenses each having the optical axis center coinciding with the optical axis center L of the refractive optics. Accordingly, reduction in size and weight can be achieved.

Here, the lenses 141 to 143 have non-circular shapes. Accordingly, the lenses 141 to 143 cannot be rotated when the lenses 141 to 143 are moved for purposes such as adjusting the zoom or the focus.

In Modification 2, the guide pins 121A to 121C are inserted into the straight slots 221 to 223 and into the cam slots 321 to 323. Thus, the lenses 141 to 143 can be moved, without being rotated, by the rotation of the second lens frame 320.

In Modification 2, the adjuster 324 is provided on the second lens frame 320. Thus, the second lens frame 320 can be rotated easily by using the adjuster 324.

Modification 3

Modification 3 of the first embodiment will be described below with reference to the drawings. The difference between Modification 3 and Modification 2 of the first embodiment will be mainly described below. Specifically, Modification 3 is different from Modification 2 in the configuration of the holders 120.

(Configuration of Refractive Optics)

A refractive optics according to Modification 3 will be described below with reference to the drawings. Since the configuration of a refractive optics 100 is the same as that of Modification 2 except for the configuration of the holders 120, a detailed description thereof will be omitted. The refractive optics 100 includes holders 420 (holders 420A to 420C) instead of the holders 120 (holders 120A to 120C).

Figure 10:
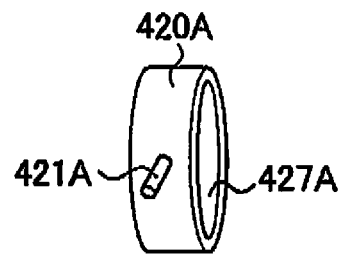
FIG. 10 is a view showing a holder 420A according to Modification 3 of the first embodiment.

As shown in FIG. 10, the holder 420A has an inner wall surface 427A holding a lens 141, as similar to the holder 120A. The holder 420A has a cylindrical shape. In other words, the holder 420A has an annular cross section.

The holder 420A has a guide pin 421A which protrudes outward in a radial direction of a circle formed by the inner wall surface 427A.

Figure 11:
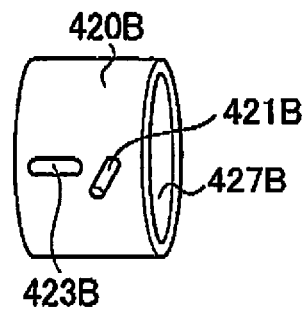
FIG. 11 is a view showing a holder 420B according to Modification 3 of the first embodiment.

As shown in FIG. 11, the holder 420B has an inner wall surface 427B holding a lens 142, as similar to the holder 120B. The holder 420B has a cylindrical shape. In other words, the holder 420B has an annular cross section.

The holder 420A is held on the inner side of the inner wall surface 427B. As a matter of course, the length of the holder 420E (inner wall surface 427B) at the optical axis center L, and the position of the lens 142 are adjusted so that the holder 420A and the lens 142 do not interfere with the holder 420E and the lens 142 on the inner side of the inner wall surface 427B.

The holder 420B has a guide pin 421B which protrudes outward in a radial direction of a circle formed by the inner wall surface 427B. The holder 420E has a straight slot 423B extending in the direction of the optical axis center L of the refractive optics 100. The guide pin 421A is inserted into the straight slot 423B.

Figure 12:
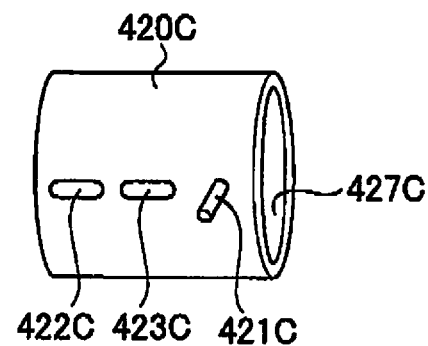
FIG. 12 is a view showing a holder 420C according to Modification 3 of the first embodiment.

As shown in FIG. 12, the holder 420C has an inner wall surface 427C holding a lens 143, as similar to the holder 120C. The holder 420C has a cylindrical shape. In other words, the holder 420C has an annular cross section.

The holder 420B is held on the inner side of the inner wall surface 427C. As a matter of course, the length of the holder 420C (inner wall surface 427C) at the optical axis center L, and the position of the lens 143 are adjusted so that the holder 420B and the lens 143 do not interfere with the holder 420C and the lens 143 on the inner side of the inner wall surface 427C.

The holder 420C has a guide pin 421C which protrudes outward in a radial direction of a circle formed by the inner wall surface 427C. The holder 420C has straight slots 422C and 423C extending in the direction of the optical axis center L of the refractive optics 100. The guide pin 421B is inserted into the straight slot 422C. The guide pin 421A is inserted into the straight slot 423C.

Figure 13:
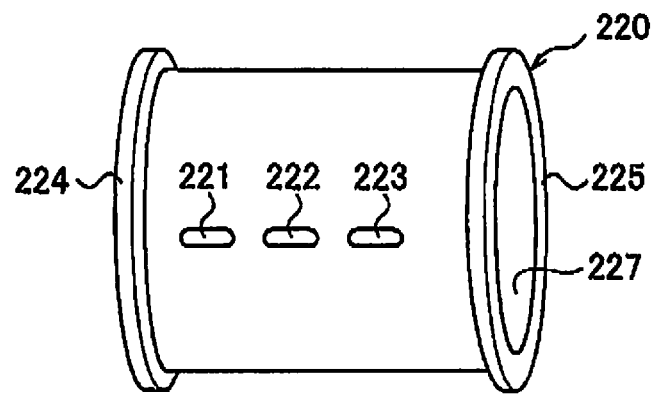
FIG. 13 is a view showing a first lens frame 220 according to Modification 3 of the first embodiment.
Figure 14:
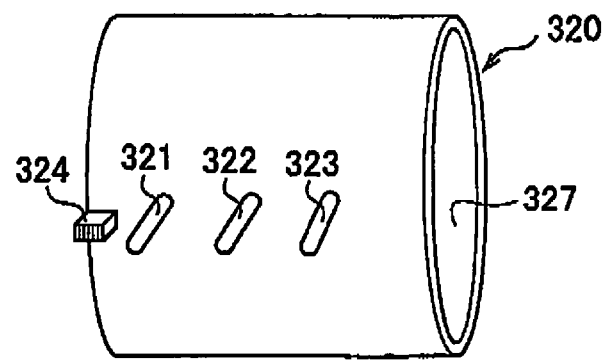
FIG. 14 is a view showing a second lens frame 320 according to Modification 3 of the first embodiment.

As shown in FIG. 13, a first lens frame 220 has the same configuration as that of Modification 2 (see FIG. 7). In addition, as shown in FIG. 14, a second lens frame 320 has the same configuration as that of Modification 2 (see FIG. 8).

Here, a front case 20 includes the holder 420A, the holder 420B, the holder 420C, the first lens frame 220, and the second lens frame 320. The holder 420A, the holder 420B, the holder 420C, the first lens frame 220, and the second lens frame 320 are provided in this order from the inner side of the front case 20.

Note that, the guide pin 421A is inserted into the straight slot 423B, the straight slot 423C, the straight slot 221, and the cam slot 321. The guide pin 421B is inserted into the straight slot 422C, the straight slot 222, and the cam slot 322. The guide pin 421C is inserted into the straight slot 223 and the cam slot 323.

As similar to Modification 2, when an adjuster 324 is used to rotate the second lens frame 320, the holders 420 move along the optical axis center L of the refractive optics 100 without changing the directions of the non-circular lenses held by the holders 420. In other words, the lenses 141 to 143 move along the optical axis center L of the refractive optics 100 by the rotation of the second lens frame 320.

(Operation and Effect)

In Modification 3, as similar to Modification 2, the lenses 141 to 143 can be moved without being rotated.

Modification 4

Modification 4 of the first embodiment will be described below with reference to the drawings. The difference between Modification 4 and Modification 2 of the first embodiment will be mainly described below. Specifically, each holder is provided with three guide pins in Modification 4.

Figure 15:
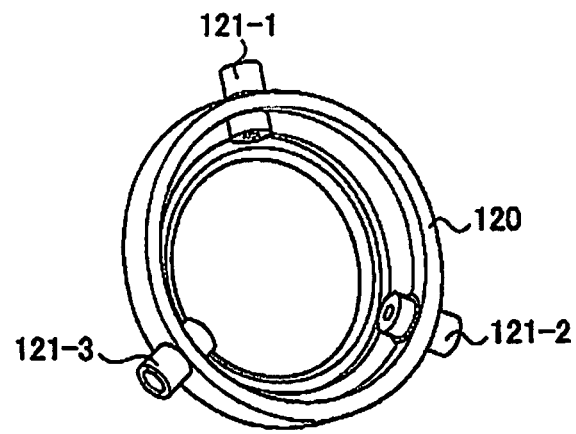
FIG. 15 is a view showing a holder 120 according to Modification 4 of the first embodiment.

FIG. 15 is a view showing a holder 120 according to Modification 4. As shown in FIG. 15, the holder 120 has three guide pins 121 (guide pins 121-1 to 121-3).

Figure 16:
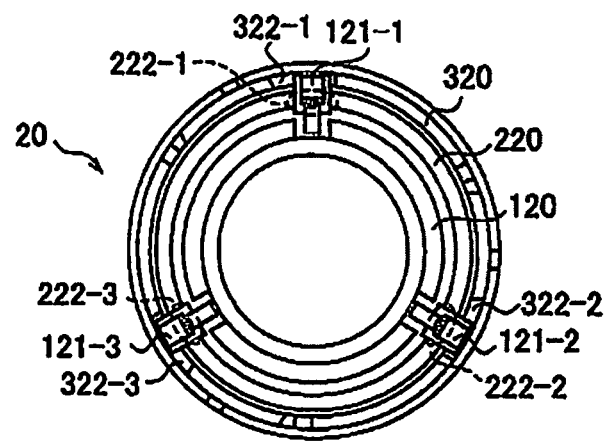
FIG. 16 is a view showing a cross section of a front case 20 according to Modification 4 of the first embodiment.
Figure 17:
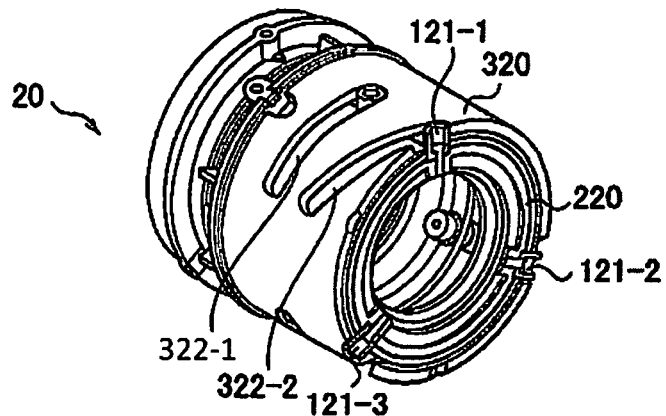
FIG. 17 is a perspective view showing the front case 20 according to Modification 4 of the first embodiment.

FIG. 16 is a view showing a cross section of a front case 20 according to Modification 4. FIG. 17 is a perspective view showing the front case 20 according to Modification 4.

As shown in FIGS. 16 and 17, a first lens frame 220 has three straight slots (for example, straight slots 222-1 to 222-3) respectively corresponding to the three guide pins 121 provided to the holder 120. A second lens frame 320 has three cam slots (for example, cam slots 322-1 to 322-3) respectively corresponding to the three guide pins 121 provided to the holder 120.

In this section, the difference from Modification 2 has been described. However, as a matter of course, the holders may also have three guide pins in Modification 3. Specifically, three guide pins may be provided to each of the holders 420A to 420C.

Note that, it is preferable that the three guide pins are provided on the outer circumference of the holder 120 at equal intervals. Similarly, it is preferable that the three straight slots are provided on the outer circumference of the first lens frame 220 at equal intervals, and the three cam slots are provided on the outer circumference of the second lens frame 320 at equal intervals.

(Operation and Effect)

In Modification 4, the holder 120 is supported by the first lens frame 220 and the second lens frame 320 via the three guide pins 121 provided to the holder 120. Accordingly, the holder 120 can be moved while being stably supported.

Modification 5

Modification 5 of the first embodiment will be described below with reference to the drawings. The difference between Modification 5 and Modification 2 or 3 of the first embodiment will be mainly described below. Specifically, a front case 20 has multiple types of lens units in Modification 5.
(Configuration of Front Case)

The outline of the front case of Modification 5 will be described below. Specifically, the front case 20 has a first lens unit and a second lens unit.

The first lens unit is configured to be rotatable, and is, for example, a unit used for a focus adjustment. The first lens unit holds a non-circular lens, and the non-circular lens is moved by the rotation of the first lens unit. Thus, the focus adjustment is achieved.

Although a detailed description is omitted here, as in Modification 2 and Modification 3 described above, the first lens unit has a lens frame having a straight slot and a lens frame having a cam slot, and the non-circular lens is moved, without being rotated, by the rotation of the first lens unit. Moreover, the first lens unit is configured to be rotatable independently of the second lens unit.

The second lens unit is configured to be rotatable, and is, for example, a unit used for a zoom adjustment. The second lens unit holds a non-circular lens, and the non-circular lens is moved by the rotation of the second lens unit. Thus, the zoom adjustment is achieved.

Although a detailed description is omitted here, as in Modification 2 and Modification 3 described above, the second lens unit has a lens frame having a straight slot and a lens frame having a cam slot, and the non-circular lens is moved, without being rotated, by the rotation of the second lens unit. Moreover, the second lens unit is configured to be rotatable independently of the first lens unit.
(Configuration of Lens Frames)

Figure 18:
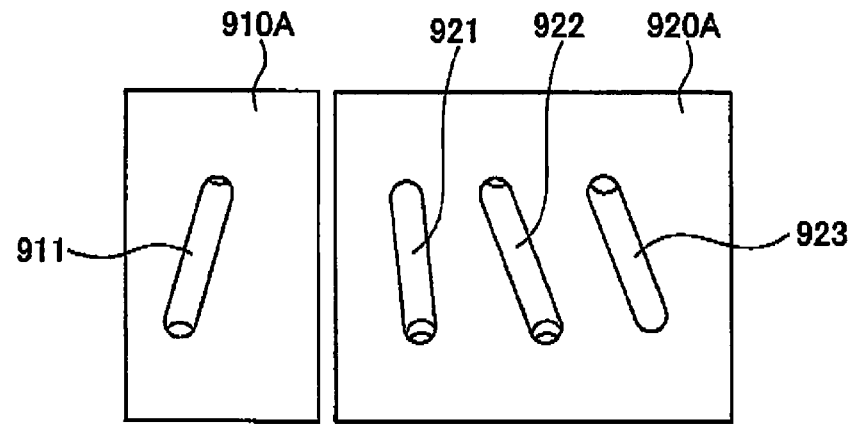
FIG. 18 is a view showing lens frames provided in a first lens unit and a second lens unit according to Modification 5 of the first embodiment.
Figure 19:
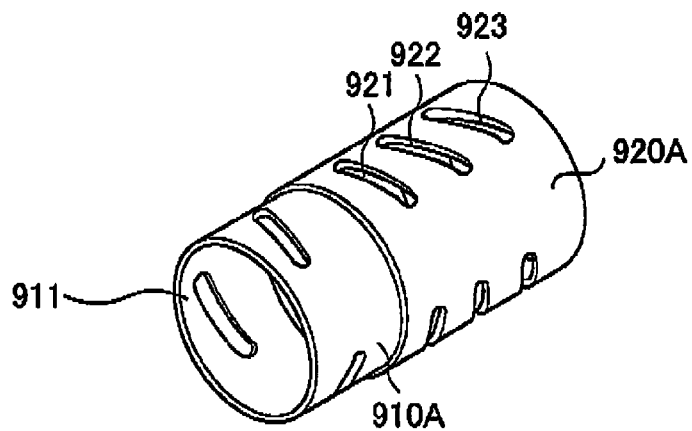
FIG. 19 is a view showing one of the lens frames provided in the first lens unit and the second lens unit according to Modification 5 of the first embodiment.

A configuration of lens frames according to Modification 5 will be described below with reference to the drawings. FIGS. 18 and 19 are views showing lens frames provided in the first lens unit and the second lens unit according to Modification 5. In this section, only the lens frames provided with the cam slots are described among the multiple lens frames provided in the first lens unit and the second lens unit.

As shown in FIGS. 18 and 19, the first lens unit has a lens frame 910A provided with cam slots 911. Meanwhile, the second lens unit has a lens frame 920A provided with cam slots 921 to 923.

Here, the cam slots 911 each have an inclination for moving the non-circular lens in the focus adjustment. The cam slots 921 to 923 each have an inclination for moving the non-circular lenses in the zoom adjustment.

For example, in a case where Modification 5 is applied to Modifications 2 and 3, the front case 20 newly includes the first lens unit, and includes the second lens unit having the second lens frame 320 as the lens frame 920A.
(Operation and Effect)

In Modification 5, the first lens unit and the second lens unit are configured to be rotatable independently of each other. Moreover, the first lens unit has the lens frame 910A provided with the cam slots 911 for moving the non-circular lens in the focus adjustment. The second lens unit has the lens frame 920A provided with the cam slots 921 to 923 for moving the non-circular lenses in the zoom adjustment.

This configuration enables achievement of both the focus adjustment and the zoom adjustment. Note that, Modification 5 also has the same effects as those of Modifications 2 and 3, as a matter of course.

Modification 6

Modification 6 of the first embodiment will be described below with reference to the drawings. In Modification 6, a method of a position adjustment of a non-circular lens will be described with reference to FIGS. 20 to 24, sequentially. Note that, Modification 6 is applicable to any of the first embodiment and Modifications 1 to 5.

Figure 20:
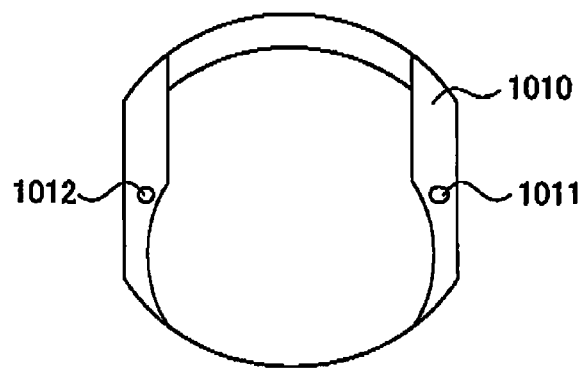
FIG. 20 is a view for describing a method of position adjustment of a non-circular lens according to Modification 6 of the first embodiment.

Firstly, as shown in FIG. 20, positioning holes 1011 and 1012 are formed in a non-circular lens 1010.

Figure 21:
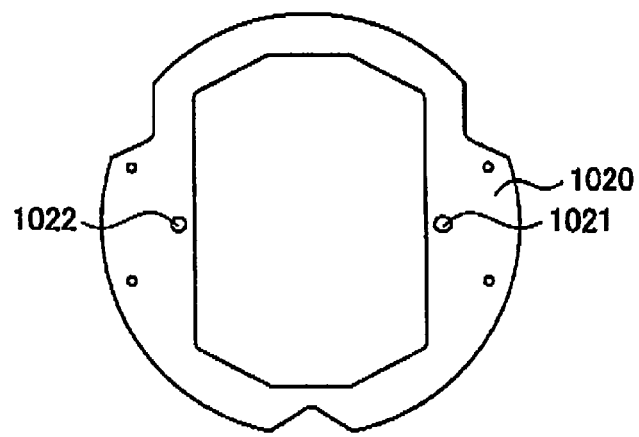
FIG. 21 is a view for describing the method of position adjustment of a non-circular lens according to Modification 6 of the first embodiment.

Secondly, as shown in FIG. 21, positioning holes 1021 and 1022 are formed in a holder 1020.

Figure 22:
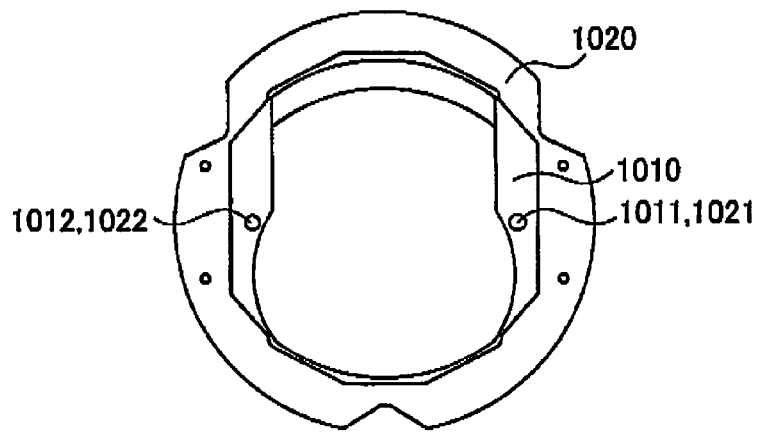
FIG. 22 is a view for describing the method of position adjustment of a non-circular lens according to Modification 6 of the first embodiment.

Thirdly, as shown in FIG. 22, the non-circular lens 1010 is inserted into the holder 1020 in a manner that the positioning hole 1011 overlaps the positioning hole 1021, and that the positioning hole 1012 overlaps the positioning hole 1022. Thereafter, a pin (not shown) is inserted into the positioning holes 1011 and 1021, and a pin (not shown) is inserted into the positioning holes 1012 and 1022. Thus, the non-circular lens 1010 is temporarily fixed to the holder 1020.

Figure 23:
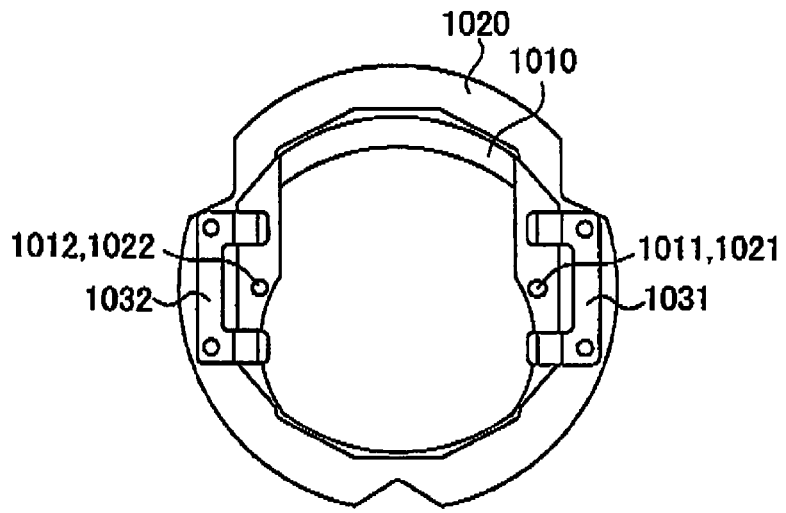
FIG. 23 is a view for describing the method of position adjustment of a non-circular lens according to Modification 6 of the first embodiment.

Fourthly, as shown in FIG. 23, the non-circular lens 1010 is pressed against the holder 1020 by pressing pieces 1031 and 1032 provided on the holder 1020. Subsequently, the position of the non-circular lens 1010 is aligned while the non-circular lens 1010 is pressed against the holder 1020 with a certain level of tension. For example, the position of the non-circular lens 1010 is aligned using an eccentricity microscope.

Figure 24:
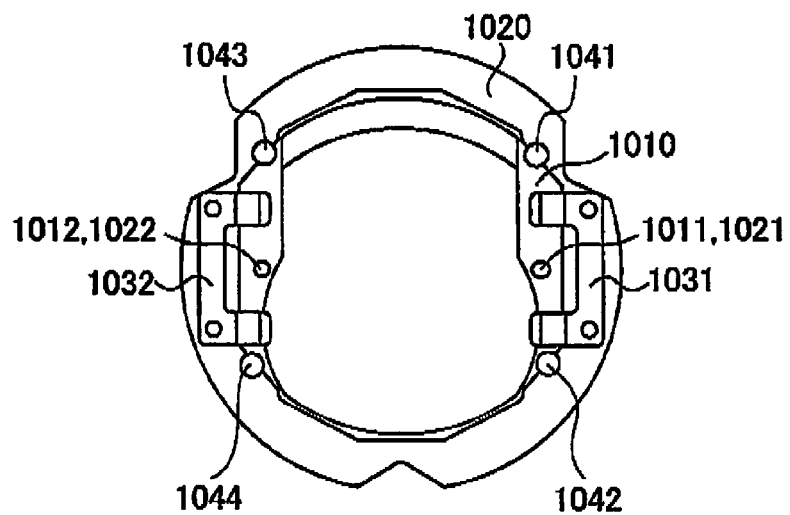
FIG. 24 is a view for describing the method of position adjustment of a non-circular lens according to Modification 6 of the first embodiment.

Fifthly, after the alignment of the position of the non-circular lens 1010 is completed, the non-circular lens 1010 is fixed to the holder 1020 by adhesives 1041 to 1044 as shown in FIG. 24.

Second Embodiment

A second embodiment will be described below with reference to the drawings. In the second embodiment, a description will be given of a projection display apparatus provided with a projection optics having the refractive optics described above.
(Configuration Example of Projection Display Apparatus)

Figure 25:
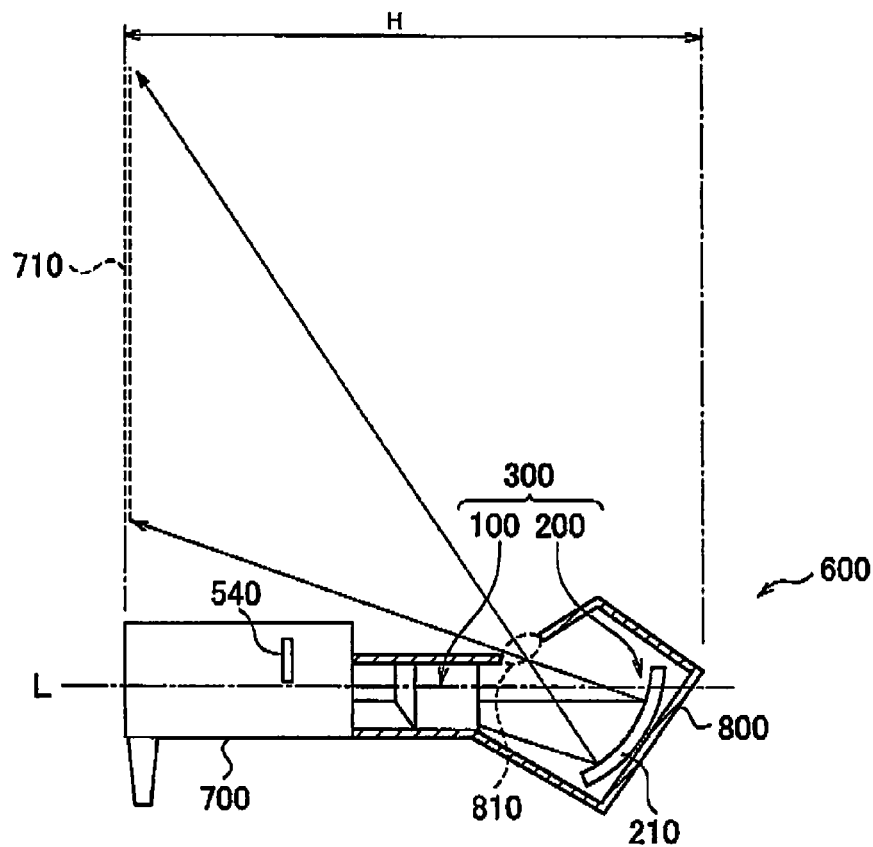
FIG. 25 is a view showing a first configuration example of a projection display apparatus 600 according to a second embodiment.
Figure 26:
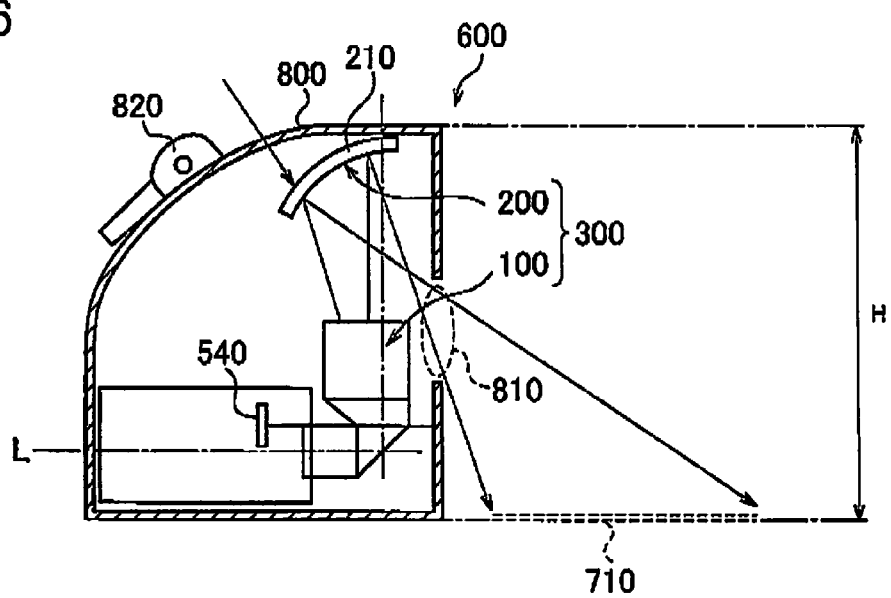
FIG. 26 is a view showing a second configuration example of the projection display apparatus 600 according to the second embodiment.

A configuration example of the projection display apparatus will be described below with reference to the drawings. FIG. 25 is a view showing a first configuration example of a projection display apparatus 600. FIG. 26 is a view showing a second configuration example of the projection display apparatus 600.

As shown in FIGS. 25 and 26, the projection display apparatus 600 includes a projection optics 300, an image light generator 700, and a protective cover 800.

The projection optics 300 projects image light emitted from the image light generator 700 on a projection surface 710. Specifically, the projection optics 300 has a refractive optics 100 and a reflective optics 200. Since the refractive optics 100 has the same configuration as those of the first embodiment and Modifications 1 to 3, a description of the refractive optics 100 is omitted.

The reflective optics 200 has a reflecting mirror 210. The reflecting mirror 210 reflects the image light outputted from the refractive optics 100. The reflecting mirror 210 collects the image light and projects the image light with wide angle.

For example, the reflecting mirror 210 is an aspherical mirror having a concave surface on the image light generator 700 side.

The image light generator 700 generates the image light. Specifically, the image light generator 700 has at least an imager 540 which outputs the image light. The imager 540 is provided at a position shifted from an optical axis center L of the refractive optics 100. For example, the imager 540 is a reflective liquid crystal panel, a transmissive liquid crystal panel, a DMD (Digital Micromirror Device), or the like.

The protective cover 800 is a cover which protects the reflecting mirror 210. The protective cover 800 is provided at least on a light path of the image light reflected by the reflecting mirror 210. The protective cover 800 has a transmission region 810 which transmits the image light. Note that, the reflecting mirror 210 preferably collects the image light at a position near the transmission region 810.

As shown in FIG. 25, in a first configuration example of the projection display apparatus 600, an optical axis of the refractive optics 100 is not bent. Meanwhile, as shown in FIG. 26, in a second configuration example of the projection display apparatus 600, the optical axis of the refractive optics 100 is bent.

Accordingly, in the second configuration example of the projection display apparatus 600, a projection distance H can be made smaller than that in the first configuration example of the projection display apparatus 600.

Note that, as shown in FIG. 26, the projection display apparatus 600 has a stand 820 in the second configuration example. The stand 820 is not especially used in a state shown in FIG. 26 (for example, in floor-standing projection). On the other hand, when the projection display apparatus 600 is in a state rotated from the state shown in FIG. 26 at 90° (for example, in wall-hanging projection), the stand 820 functions as a member supporting the projection display apparatus 600. Note that, the stand 820 may function as a handle used to carry the projection display apparatus 600.

(Configuration of Image Light Generator)

Figure 27:
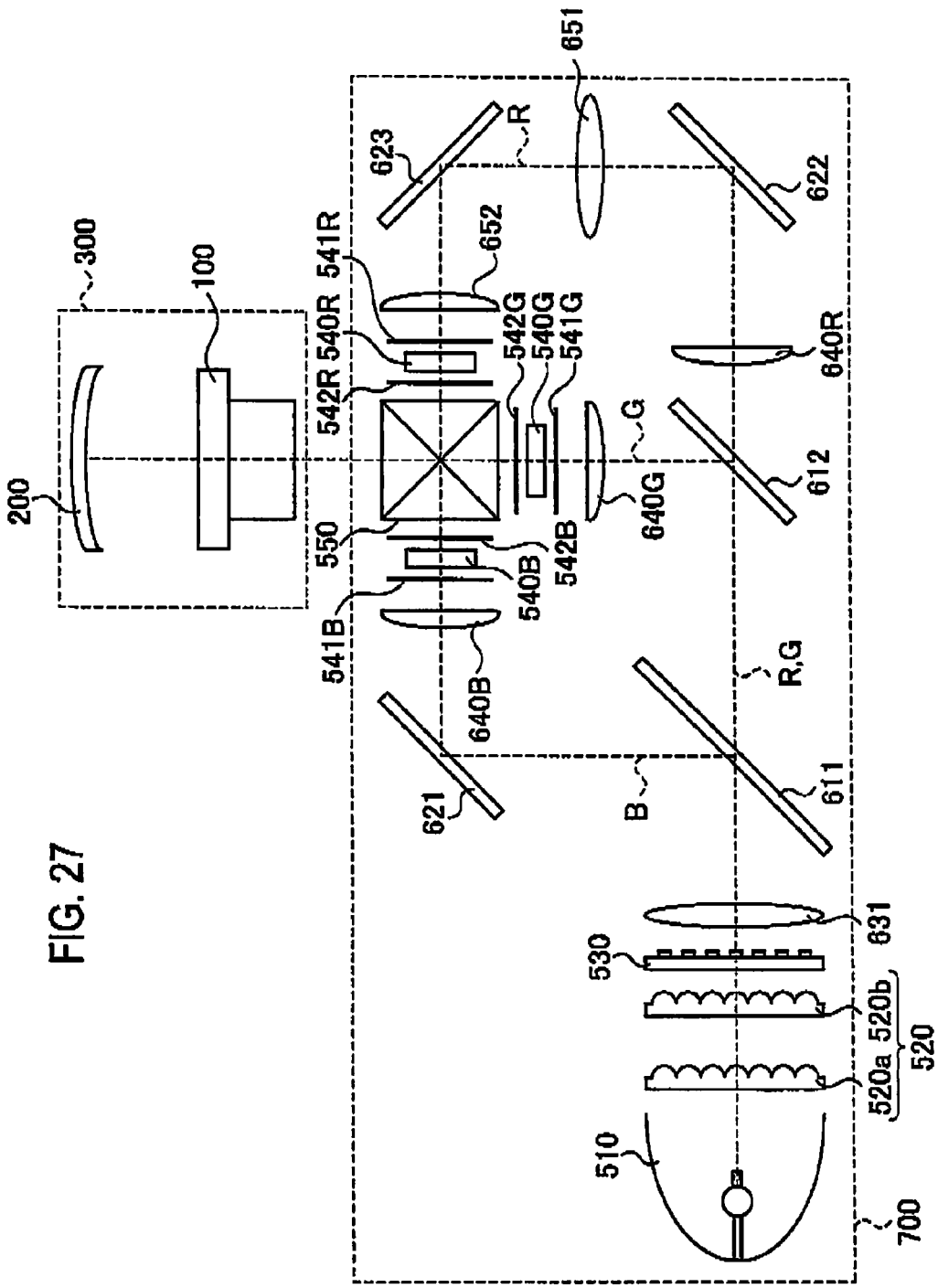
FIG. 27 is a view mainly showing an image light generator 700 according to the second embodiment.

A configuration of the image light generator according to the second embodiment will be described below with reference to the drawings. FIG. 27 is a view mainly showing the image light generator 700 according to the second embodiment. The image light generator 700 includes a power supply circuit (not shown), an image signal processing circuit (not shown), and the like, in addition to the configuration shown in FIG. 27. Here, a case where the imager 540 is a transmissive liquid crystal panel will be described as an example.

The image light generator 700 includes a light source 510, a fly-eye lens unit 520, a PBS array 530, multiple liquid crystal panels 540 (liquid crystal panel 540R, liquid crystal panel 540G, and liquid crystal panel 540B), and a cross dichroic prism 550.

The light source 510 is, for example, a UHP lamp including a burner and a reflector. The light emitted from the light source 510 includes red component light, green component light, and blue component light.

The fly-eye lens unit 520 makes the light beams emitted from the light source 510 uniform. Specifically, the fly-eye lens unit 520 includes fly-eye lenses 520a and 520b.

The fly-eye lenses 520a and 520b each include multiple microlenses. Each of the microlenses condenses the light emitted from the light source 510 in such a manner that the entire surfaces of the liquid crystal panels 540 are irradiated with the light emitted from the light source 510.

The PBS array 530 causes the polarization states of the light beams emitted from the fly-eye lens unit 520 to be uniform. In the first embodiment, the PBS array 530 uniformly causes the light beams emitted from the fly-eye lens unit 520 to be P-polarized light beams.

The liquid crystal panel 540R modulates the red component light by rotating the polarization direction of the red component light. On a light-input surface side of the liquid crystal panel 540R, an input-side polarizing plate 541R is provided which transmits light having a certain polarization direction (for example, P polarization) and which blocks light having a different polarization direction (for example, S polarization). On a light-output surface side of the liquid crystal panel 540R, an output-side polarizing plate 542R is provided which blocks light having the certain polarization direction (for example, P polarization) and which transmits light having a different polarization direction (for example, S polarization).

Similarly, the liquid crystal panels 540G and 540B modulate the green component light and the blue component light by rotating the polarization directions of the green component light and the blue component light, respectively. On a light-input surface side of the liquid crystal panel 540G, an input-side polarizing plate 541G is provided. On a light-output surface side of the liquid crystal panel 540G, an output-side polarizing plate 542G is provided. On a light-input surface side of the liquid crystal panel 540B, an input-side polarizing plate 541B is provided. On a light-output surface side of the liquid crystal panel 540B, an output-side polarizing plate 542B is provided.

The cross dichroic prism 550 combines the light outputted from the liquid crystal panel 540R, the light outputted from the liquid crystal panel 540G, and the light outputted from the liquid crystal panel 540B. The cross dichroic prism 550 outputs the combined light (image light) to the projection optics 300.

The image light generator 700 also includes a mirror group (dichroic mirrors 611 and 612 and reflecting mirrors 621 to 623) and a lens group (condenser lenses 631, 640R, 640G, and 640B, and relay lenses 651 and 652).

The dichroic mirror 611 transmits the red component light and the green component light of the light outputted from the PBS array 530. The dichroic mirror 611 reflects the blue component light of the light outputted from the PBS array 530.

The dichroic mirror 612 transmits the red component light of the light having transmitted the dichroic mirror 611. The dichroic mirror 612 reflects the green component light of the light having transmitted the dichroic mirror 611.

The reflecting mirror 621 reflects the blue component light and guides the blue component light to the liquid crystal panel 540B. The reflecting mirrors 622 and 623 each reflect the red component light and guide the red component light to the liquid crystal panel 540R.

The condenser lens 631 is a lens which condenses white light emitted from the light source 510.

The condenser lens 640R causes the red component light to be approximately parallel rays so that the liquid crystal panel 540R is irradiated with the red component light. The condenser lens 640G causes the green component light to be approximately parallel rays so that the liquid crystal panel 540G is irradiated with the green component light. The condenser lens 640B causes the blue component light to be approximately parallel rays so that the liquid crystal panel 540B is irradiated with the blue component light.

The relay lenses 651 and 652 roughly image the red component light on the liquid crystal panel 540R while suppressing an expansion of the red component light.

The present invention has been described by using the embodiments described above. However, it should not be understood that the description and drawings which constitute part of this disclosure limit the present invention. From this disclosure, various alternative embodiments, examples, and operation techniques will be easily found by those skilled in the art.

In the first embodiment, the front case 20 houses multiple non-circular lenses. However, the invention is not limited to this configuration. Any number of non-circular lenses may be housed in the front case 20.

In the embodiments described above, the non-circular lenses each have the non-circular shape as a molded product. However, embodiments are not limited to this configuration. For example, the non-circular lenses may each have a circular shape as a molded product, as long as the non-circular lenses each have the effective region P with the non-circular shape.

INDUSTRIAL APPLICABILITY

The present invention can provide the refractive optics and the projection display apparatus which can achieve reduction in size and weight.

The invention claimed is:

1. A refractive optics which forms part of a projection optics including a reflective optics having at least one reflecting mirror and which has a group of lenses, the refractive optics comprising:
a non-circular lens which is a lens in the group of lenses provided on a side closer to the reflective optics; and
a holder which has an inner wall surface holding the non-circular lens and which has an annular cross section, wherein
the non-circular lens has an optical axis center coinciding with an optical axis center of the refractive optics, and has a non-circular shape forming part of an imaginary circular region whose center is the optical axis center of the refractive optics,
the optical axis center of the non-circular lens does not coincide with a center axis of a cylinder formed by the inner wall surface, and
the projection optics further includes imager output light guide circular lenses having optical axes that coincide with the optical axis center of the refractive optics provided on a side closer to an image light generator, and the diameter of the imaginary circular region is set larger than the diameter of any of the imager output light guide circular lenses.

2. The refractive optics according to claim 1, further comprising:
a first lens frame which has an inner wall surface holding the holder and which has an annular cross section; and
a second lens frame which has an inner wall surface holding the first lens frame and which has an annular cross section, wherein
the holder has a guide pin which protrudes outward in a radial direction of a circle formed by the inner wall surface of the holder,
the first lens frame has a straight slot which extends in a direction along an optical axis of the refractive optics, the second lens frame has a cam slot which extends in a direction oblique to the optical axis of the refractive optics, and
the guide pin is inserted into the straight slot and the cam slot.

3. The refractive optics according to claim 2, wherein the second lens frame has an adjuster which protrudes outward in a radial direction of a circle formed by an inner wall surface of the second lens frame.

4. The refractive optics according to claim 1, wherein an effective region of the non-circular lens is provided at an area not overlapping the optical axis center of the refractive optics.

5. The refractive optics according to claim 1, wherein the reflecting mirror is a concave mirror.

6. A projection display apparatus comprising:
an imager; and
a projection optics configured to project light outputted from the imager, wherein
the projection optics includes a refractive optics and a reflective optics having at least one reflecting mirror, the refractive optics including a plurality of lenses,
the refractive optics has a non-circular lens and a holder, the non-circular lens being one of the plurality of lenses provided on a side closer to the reflective optics, the holder having an annular cross section and having an inner wall surface holding the non-circular lens,
the non-circular lens has an optical axis center coinciding with an optical axis center of the refractive optics, and has a non-circular shape forming part of an imaginary circular region whose center is the optical axis center of the refractive optics,
the optical axis center of the non-circular lens does not coincide with a center axis of a cylinder formed by the inner wall surface,
the imager is provided at a position shifted from the optical axis center of the refractive optics, and
the projection optics further includes imager output light guide circular lenses having optical axes that coincide with the optical axis center of the refractive optics provided on a side closer to an image light generator, and the diameter of the imaginary circular region is set larger than the diameter of any of the imager output light guide circular lenses.

7. The projection display apparatus of claim 6, wherein the diameter of the imaginary circular region is set larger than the diameter of any of the refractive optics lenses provided on a side further away from the reflective optics.

8. The projection display apparatus of claim 6, wherein the non-circular lenses are provided at positions not overlapping the optical axis center of the refractive optics such that light outputted from the refractive optics lenses provided on a side further away from the reflective optics does not pass through the optical axis of the refractive optics.

9. The projection display apparatus of claim 7, wherein the non-circular lenses are provided at positions not overlapping the optical axis center of the refractive optics such that light outputted from the refractive optics lenses provided on a side further away from the reflective optics does not pass through the optical axis of the refractive optics.

* * * * *